United States Patent
Springer

[11] Patent Number: 5,201,587
[45] Date of Patent: Apr. 13, 1993

[54] DISENGAGING NEEDLE ROLLER THRUST BEARING ASSEMBLY

[75] Inventor: James A. Springer, Ypsilanti, Mich.

[73] Assignee: General Motors Corporation, Detroit, Mich.

[21] Appl. No.: 860,400

[22] Filed: Mar. 30, 1992

[51] Int. Cl.⁵ .............................................. F16C 19/30
[52] U.S. Cl. ...................................... 384/620; 384/622
[58] Field of Search ............... 384/620, 622, 621, 611, 384/615, 581

[56] References Cited
U.S. PATENT DOCUMENTS

| | | |
|---|---|---|
| 3,431,035 | 6/1967 | Dangauthier . |
| 3,934,956 | 1/1976 | Pitner .................................. 384/620 |
| 3,976,340 | 8/1976 | Pitner . |
| 4,168,869 | 9/1979 | Stephan ............................... 384/620 |
| 4,438,989 | 3/1984 | Negele et al. . |
| 4,981,373 | 1/1991 | Bando .................................. 384/622 |

Primary Examiner—Lenard A. Footland
Attorney, Agent, or Firm—Kevin M. Hinman

[57] ABSTRACT

A thrust bearing having an integral axially oriented resilient means provides a gap between unloaded thrust surfaces. The gap is sufficiently large to prevent bearing rollers from contacting both thrust surfaces simultaneously. Providing such a gap reduces noise from unloaded thrust bearings.

11 Claims, 2 Drawing Sheets

DISENGAGING NEEDLE ROLLER THRUST BEARING ASSEMBLY

TECHNICAL FIELD

This invention relates to needle roller thrust bearings and their use within motor vehicle transmissions.

BACKGROUND OF THE INVENTION

Motor vehicle transmission components are subject to excitation by drivetrain impulses such as the firing frequency of an engine to which the transmission is coupled. This excitation can result in noise that can be perceived by the vehicle operator.

Needle roller thrust bearings are one component susceptible to such excitation, particularly when they are unloaded.

SUMMARY OF THE INVENTION

It has been found that noise from unloaded needle roller thrust bearings decreases with an increase in the amount of axial space available at the bearing location.

This invention reduces noise from unloaded needle roller bearing excitation by increasing the axial space between races. The invention employs resilient means to spread apart the thrust surfaces of the bearing races when the bearing is unloaded, thereby reducing contact between the bearing rollers and the thrust surfaces.

It is an object of this invention to provide a needle roller bearing that produces less noise than conventional needle roller bearings.

It is also an object to provide a needle roller bearing that has a resilient means integral with the bearing races for axially displacing the races such that their thrust surfaces are sufficiently distant from each other to reduce the contact between the rollers and the thrust surfaces, thereby reducing thrust bearing noise.

These and other objects and advantages will be more apparent from the following description and drawings.

DESCRIPTION OF THE PREFERRED EMBODIMENT

Figure 1:
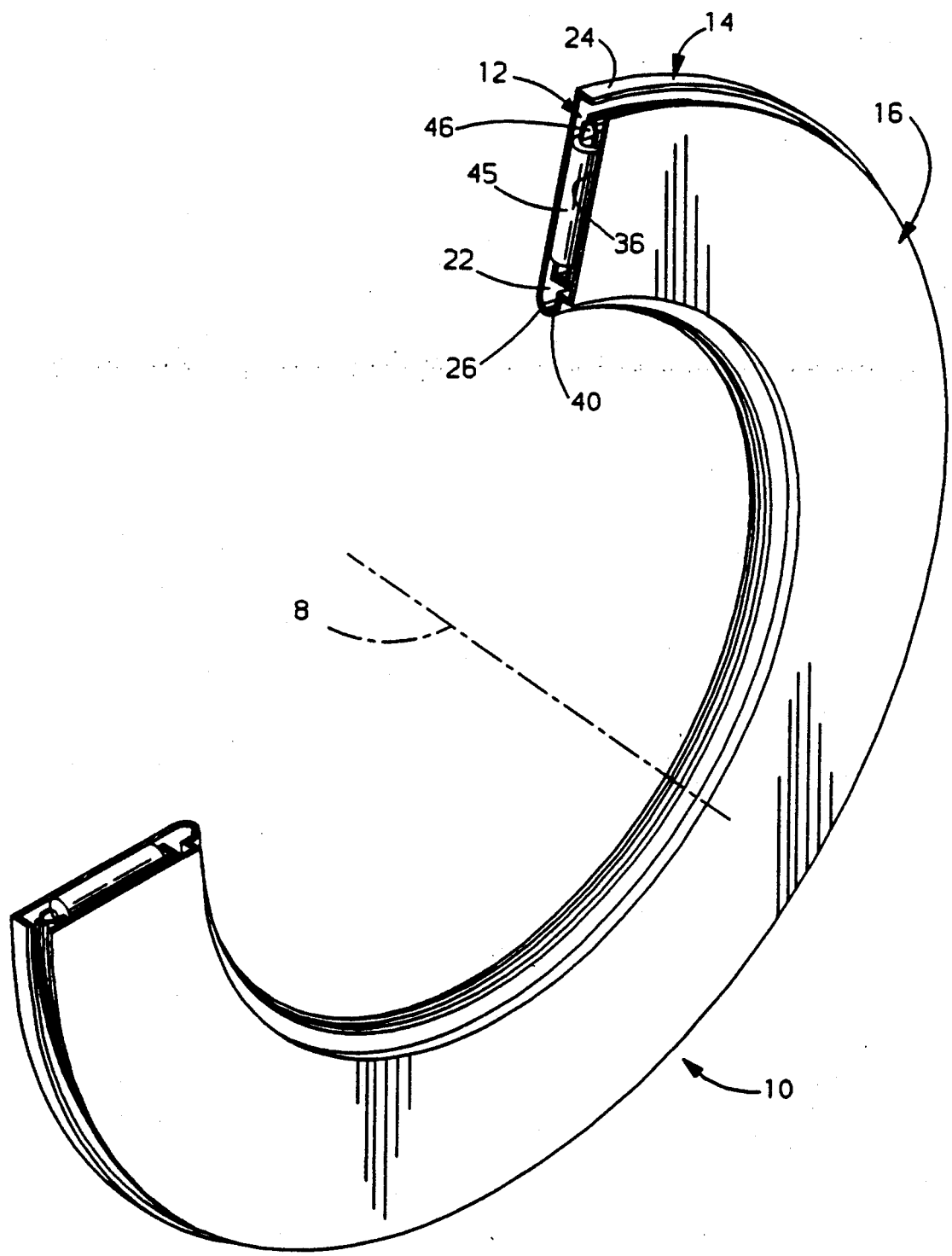
FIG. 1 shows a perspective view of a disengaging thrust bearing having resilient means at an inside diameter, with a section removed for viewing of the rollers and retaining cage.
Figure 3:
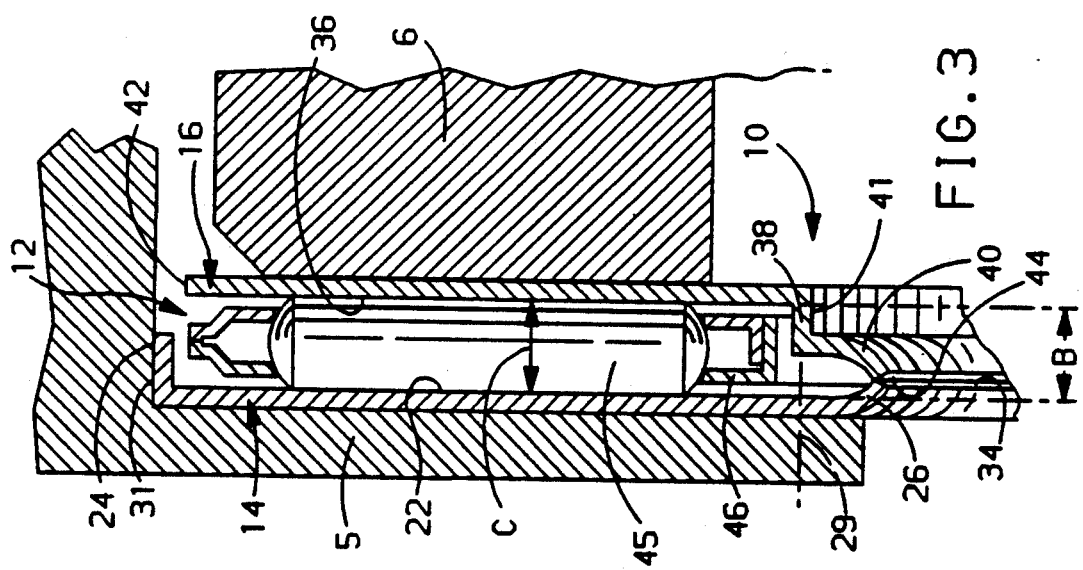
FIG. 3 shows a sectional side view of a bearing with resilient means at an inside diameter in a loaded condition.
Figure 2:
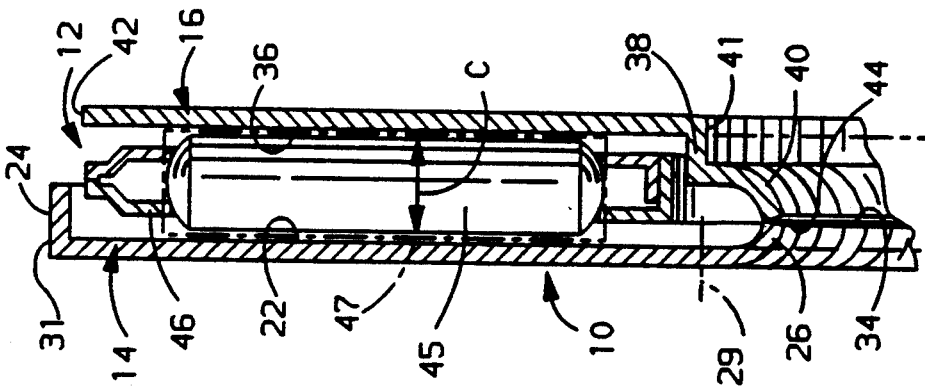
FIG. 2 shows a sectional side view of a bearing with resilient means at an inside diameter in an unloaded condition.

A transmission (not shown) has a first member 5 and a second member 6, shown in FIG. 3, with an axis of rotation 8, shown in FIG. 1, passing through both members 5, 6. A disengaging thrust bearing 10 is axially disposed between the first and second members 5,6, and is centered on the axis of rotation 8.

The first member 5 and the second member 6 are representative of components of a planetary gear system (not shown). The first member 5 represents a ring gear hub. The second member 6 represents a planet gear carrier. Planet gears (not shown), a ring gear (not shown), and a sun gear (not shown) all have engaging helical teeth. The transmission of torque through the helical teeth results in a thrust load tending to displace the loaded gears relative to one another. The thrust load can press together parts axially linked to the gears such as the ring gear hub and the planet gear carrier.

The first member 5 and the second member 6 are intermittently pressed toward each other 6, 5 by the thrust loads.

The disengaging thrust bearing 10 has three principal components: a caged needle roller assembly 12, a first race 14, and a second race 16. All three 12, 14, 16 are centered about the common axis of rotation 8.

The first race 14 is annular in shape. The first race 14 is a one piece forming with an integral first thrust surface 22, a first flange portion 24, and a first spring portion 26.

The first thrust surface 22 is a planar surface approximately perpendicular to the axis of rotation 8. The first thrust surface 22 has a first inside diameter circumference 29 and a first outside diameter circumference 31. The first thrust surface 22 faces the second race 16.

The first flange portion 24 extends axially toward the second race 16 from the first outside diameter circumference 31.

The first spring portion 26 extends both axially toward the second race 16 and radially inward from the first inside diameter circumference 29. The first spring portion 26 has a first edge 34 distal to the first thrust surface 22.

The second race 16 is also annular in shape. The second race 16 has a second thrust surface 36, a second flange portion 38, and a second spring portion 40. The second race 16 is a one piece forming that integrates a second thrust surface 36, a second flange portion 38, and a second spring portion 40 into the race 16.

The second thrust surface 36 is a planar surface approximately perpendicular to the axis of rotation 8. The second thrust surface 36 has a second inside diameter circumference 41 and a second outside diameter circumference 42. The second thrust surface 36 faces the first race 14.

The second flange portion 38 extends axially out from the second inside diameter circumference 41 toward the first race 14.

The second spring portion 40 projects from the second flange portion 38, distal to the second thrust surface 36. The second spring portion 40 approximates a mirror image of the first spring portion 26, and has a second edge 44 distal to the second flange portion.

It is advantageous to have the second spring portion 40 in series with the first spring portion 26 when a single spring portion would need to be thinned or made relatively long to achieve a desired spring rate. Using two spring portions 26, 40 in series reduces the amount of work needed on each race 14, 16 to provide the desired spring rate. Having the second spring portion 40 be an approximate mirror image of the first spring portion 26 helps to insure that contact between the two spring portions 26, 40 is maintained at the first edge 34 and the second edge 44 as the spring portions 26, 40 deflect.

The caged needle roller assembly 12 is interposed between the first thrust surface 22 and the second thrust surface 36. It 12 includes both a complement of radially oriented cylindrical rollers 45, and a cage 46 retaining the rollers 45. The cage 46 keeps the rollers 45 generally parallel to the thrust surfaces 22, 36, yet allows some limited relative radial and axial motion of the rollers 45 relative to the cage 46. The cage 46 limits the axial motion of the rollers relative to the cage to an axial envelope of predetermined thickness 47.

A gap width B indicates the axial distance between the thrust surfaces 22, 36. In an unloaded condition, the gap width B must exceed a diameter C of the rollers to achieve the noise reduction sought by this invention. This largely eliminates the potential for individual rollers to contact both of the thrust surfaces 22, 36 simultaneously. Increasing the gap width B in the unloaded condition so that it also exceeds the axial envelope of predetermined thickness 47 for the caged needle roller assembly 12 ensures that the full complement of bearing rollers 45 is able to contact just one of the two thrust surfaces 22, 36 at any given time. This reduces rattle of the rollers 45 and the cage 46 induced by some of the rollers 45 contacting the first thrust surface 22 simultaneous with others of the rollers 45 contacting the second thrust surface 36.

The following description of the operation of the invention helps make its advantages more apparent.

In the unloaded condition, the respective edges 34, 44 of the spring portions 26, 40 need not contact each other when the members 5, 6 are not subjected to a thrust load.

In a loaded condition, when the first and second members 5, 6 are pressed toward each other, the edges 34, 44 will first contact, and with continued displacement, the spring portions 26, 40 will deflect, bringing the rollers 45 into contact with both the first and second thrust surface 22, 36 as seen in FIG. 3.

When the members 5, 6 are no longer being pressed toward each other, the spring portions 26, 40, acting against each other, force apart the first and second members 5, 6. The spring portions 26, 40 restore the gap width B between the first and second thrust surfaces 22, 36 to at least exceed the diameter C of the rollers. This reduces the contact between the bearing rollers 45 and the thrust surfaces 22, 36, thereby reducing noise. Providing a larger gap width B which exceeds the thickness of the axial envelope 47 of the caged needle roller assembly 12 eliminates the possibility of simultaneous contact of the rollers 45 with both of the thrust surfaces 22, 36.

Figure 4:
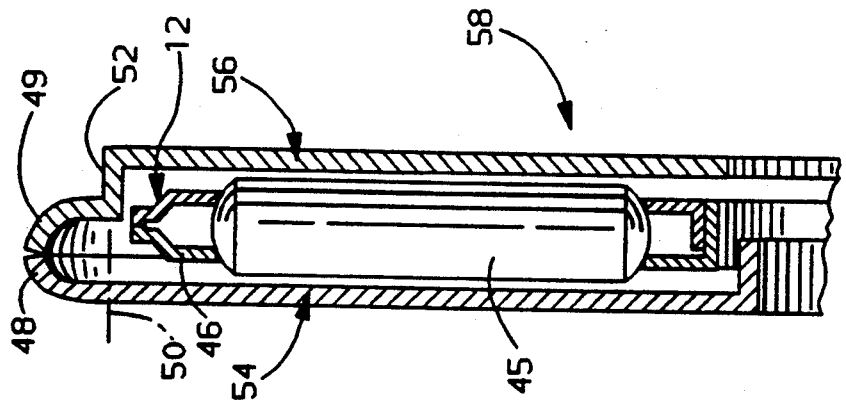
FIG. 4 shows a sectional side view of a bearing with resilient means at an outside diameter in an unloaded condition.

Alternatively, as shown in FIG. 4, first and second spring portions 48, 49 could be located proximate to first and second outer circumferences 50, 52 of first and second bearing races 54, 56. Such a disengaging thrust bearing 58 would operate in essentially the same manner as the previously described bearing 10.

The choice over whether to have spring portions 48, 49 proximate to the inner circumferences or the outer circumferences of the of the races would largely be a function of packaging concerns within the transmission. If packaging does not limit the choice, then the decision can be based on desired spring rates. A spring portion 48, 49 at the outer circumference 50, 52 essentially identical in shape to one at the inner circumference will provide a lower spring rate.

A second alternative configuration, not shown, employs a single spring portion integral with just one of the races. This may be practical where higher spring rates are desired for the spring portion.

Other alternative configurations, not shown, could have the resilient means integrated into the cage instead of into the races. One such configuration could employ a cage with a frustaconical shape, acting as a belleville spring to separate the thrust surfaces and potentially preventing the rollers from contacting either thrust surface when the first and second members are not being pressed together. The cage would tend to flatten when the members are pressed toward each other. A second configuration integrating the resilient means into the cage would employ a plurality of evenly spaced, radially oriented cantilever springs projecting axially out from the cage. Tips of the springs would press against one of the thrust surfaces, pressing the rollers against the facing thrust surface to separate the thrust surfaces. The tips would move back toward the cage as the members are pressed toward each other.

Yet other alternative configurations not shown could have the resilient means provided by a wave washer located between the two races, or by a plurality of axially oriented springs between the races.

Many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A thrust bearing for use between a first member and a second member, that rotate relative to one another about an axis and are intermittently pressed toward each other, the bearing comprising:
   a first generally annular race associated with the first member having a first thrust surface opposite the first member;
   a second generally annular race associated with the second member having a second thrust surface facing the first member;
   a caged needle roller assembly including
      a generally annular roller retention cage disposed between the first race and the second race, and
      a complement of rollers retained in the cage generally parallel to the thrust surfaces and engaged between the races when the members are loaded; and
   resilient means for axially displacing the races to provide a gap width between the races exceeding a diameter of the rollers, thereby reducing contact between the rollers and thrust surfaces and reducing bearing noise.

2. A thrust bearing as claimed in claim 1, further comprising:
   the first thrust surface being essentially perpendicular to the axis of rotation;
   the second bearing race being essentially parallel to the first thrust surface; and
   the rollers being essentially cylindrical in shape.

3. A thrust bearing as claimed in claim 2, further comprising:
   the resilient means being integral with one of the bearing races.

4. A thrust bearing as claimed in claim 3, further comprising:
   the gap width provided by the resilient means exceeding an axial envelope of predetermined thickness for the caged needle roller assembly.

5. A thrust bearing as claimed in claim 2, further comprising:
   the resilient means having a first spring portion integral with the first bearing race and a second spring portion integral with the second bearing race, the spring portions cooperating with each other in series.

6. A thrust bearing as claimed in claim 5, further comprising:
the first bearing race including a first thrust surface and the first spring portion,
the first thrust surface having a first inside diameter circumference, and
the first spring portion extending both axially toward the second race and radially inward from the first inside diameter circumference; and
the second bearing race including a second thrust surface and the second spring portion,
the second thrust surface having a second inside diameter circumference, and
the second spring portion approximating a mirror image of the first spring portion.

7. A thrust bearing as claimed in claim 6, further comprising:
the gap width provided by the resilient means exceeding an axial envelope of predetermined thickness for the caged needle roller assembly.

8. A thrust bearing as claimed in claim 5, further comprising;
the first bearing race including a first thrust surface and the first spring portion,
the first thrust surface having a first outside diameter circumference,
the first spring portion extends both axially toward the second race and radially outward from the first outside diameter circumference; and
the second bearing race including a second thrust surface, a second flange portion, and the second spring portion,
the second thrust surface having a second outside diameter circumference,
the second spring portion approximating a mirror image of the first spring portion.

9. A thrust bearing as claimed in claim 8, further comprising:
the gap width provided by the resilient means exceeding an axial envelope of predetermined thickness for the caged needle roller assembly.

10. A thrust bearing as claimed in claim 5, further comprising:
the gap width provided by the resilient means exceeding an axial envelope of predetermined thickness for the caged needle roller assembly.

11. A thrust bearing as claimed in claim 2, further comprising:
the gap width provided by the resilient means exceeding an axial envelope of predetermined thickness for the caged needle roller assembly.

* * * * *